US012645996B2

(12) United States Patent
Fellows et al.

(10) Patent No.: US 12,645,996 B2
(45) Date of Patent: Jun. 2, 2026

(54) ACTIVE LEARNING SYSTEM FOR DIGITAL PATHOLOGY

(71) Applicant: VENTANA MEDICAL SYSTEMS, INC., Tucson, AZ (US)

(72) Inventors: Hadley Fellows, Burlingame, CA (US); Mehrnoush Khojasteh, Redwood City, CA (US); Justine Larsen, Santa Clara, CA (US); Jim F. Martin, Mountain View, CA (US); Nidhin Murari, Milpitas, CA (US); Fahime Sheikhzadeh, Santa Clara, CA (US)

(73) Assignee: VENTANA MEDICAL SYSTEMS, INC., Tuscon, AZ (US)

( * ) Notice: Subject to any disclaimer, the term of this patent is extended or adjusted under 35 U.S.C. 154(b) by 661 days.

(21) Appl. No.: 18/162,565

(22) Filed: Jan. 31, 2023

(65) Prior Publication Data

US 2023/0169406 A1 Jun. 1, 2023

Related U.S. Application Data

(63) Continuation of application No. PCT/US2021/043717, filed on Jul. 29, 2021.

(Continued)

(51) Int. Cl.
*G06N 20/00* (2019.01)

(52) U.S. Cl.
CPC .................................... *G06N 20/00* (2019.01)

(58) Field of Classification Search
CPC ....................................................... G06N 20/00
See application file for complete search history.

(56) References Cited

U.S. PATENT DOCUMENTS

| | | | | |
|---|---|---|---|---|
| 10,650,520 | B1 * | 5/2020 | Beck | G06T 7/0012 |
| 11,080,855 | B1 * | 8/2021 | Beck | G16H 50/70 |

(Continued)

FOREIGN PATENT DOCUMENTS

| | | | |
|---|---|---|---|
| CN | 110023994 | A | 7/2019 |
| JP | 2019002392 | A | 1/2019 |

(Continued)

OTHER PUBLICATIONS

Chukka et al. WO2018/091486 A1, published May 24, 2018, Ventana Medical Systems, F. Hoffman-La Roche AG, (Year: 2018).*

(Continued)

*Primary Examiner* — Barbara M Level

(74) *Attorney, Agent, or Firm* — Kilpatrick Townsend & Stockton LLP

(57) ABSTRACT

A machine learning model is accessed that is configured to use one or more parameters to process images to generate labels. The machine learning model is executed to transform at least part of each of at least one digital pathology image into a plurality of predicted labels; and generate a confidence metric for each of the plurality of predicted labels. An interface is availed that depicts the at least part of the at least one digital pathology image and that differentially represents predicted labels based on corresponding confidence metrics. In response to availing of the interface, label input is received that confirms, rejects, or replaces at least one of the plurality of predicted labels. The one or more parameters of the machine learning model are updated based on the label input.

20 Claims, 6 Drawing Sheets
(1 of 6 Drawing Sheet(s) Filed in Color)

Related U.S. Application Data

(60) Provisional application No. 63/065,404, filed on Aug. 13, 2020.

(56) References Cited

U.S. PATENT DOCUMENTS

| | | | | |
|---|---|---|---|---|
| 2018/0232883 | A1 * | 8/2018 | Sethi | G06T 7/0014 |
| 2020/0250527 | A1 | 8/2020 | Zhao et al. | |
| 2020/0294231 | A1 * | 9/2020 | Tosun | G06V 20/695 |
| 2021/0259660 | A1 * | 8/2021 | Bharat | A61B 8/485 |
| 2022/0076411 | A1 * | 3/2022 | Georgescu | G06V 10/82 |

FOREIGN PATENT DOCUMENTS

| | | | |
|---|---|---|---|
| JP | 2019023392 | A | 2/2019 |
| JP | 2020013427 | A | 1/2020 |
| WO | 2019108888 | A1 | 6/2019 |
| WO | 2019110583 | A1 | 6/2019 |

OTHER PUBLICATIONS

JP Application No. 2023-509767 , “Office Action”, May 13, 2024, 5 pages.

Application No. PCT/US2021/043717, International Preliminary Report on Patentability, Mailed On Feb. 23, 2023, 6 pages.

JP2023-509767 , “Notice of Allowance”, Nov. 14, 2024, 3 pages.

PCT/US2021/043717 , “International Search Report and Written Opinion”, Mailed on Nov. 4, 2021, 11 pages.

JP Application No. 2023-509767, “Office Action”, Dec. 21, 2023, 8 pages.

European Application No. 21758255.0, Office Action, Mailed on Jun. 24, 2025, 5 pages.

CN Application No. 202180056644.0, “First Office Action,” Mailed on Dec. 25, 2025, 14 pages.

* cited by examiner

200

510

505

520

Viewer
(Data visualization and corrections)

525

Image
Management

File system

515

Content Management
System
(manage Active Learning sessions)

512 dPath dPath front end application

535

Analysis Platform
(image analysis)

540

High
Performance
System

HPC Node

545

Coding
Platforms

530

Application flow
User flow

600

ACTIVE LEARNING SYSTEM FOR DIGITAL PATHOLOGY

CROSS-REFERENCE TO RELATED APPLICATION

This application is a continuation of International Application No. PCT/US2021/043717, filed on Jul. 29, 2021, which claims the benefit of and the priority to U.S. Provisional Application No. 63/065,404, filed on Aug. 13, 2020. Each of which are hereby incorporated by reference in their entireties for all purposes.

FIELD

The present disclosure relates to digital pathology, and in particular to techniques for using active learning to efficiently train a machine-learning model to automatically detect, characterize and/or classify part or all of a digital pathology image.

BACKGROUND

Digital pathology involves scanning of the slides (e.g., histopathology or cytopathology glass slides) into digital images. The tissue and/or cells within the digital images may be subsequently examined using digital pathology image analysis and/or interpreted by a pathologist for a variety of reasons including diagnosis of disease, assessment of a response to therapy, and the development of pharmacological agents to fight disease. In order to examine the tissue and/or cells within the digital images (which are virtually transparent), the pathology slides may be prepared using various stain assays (e.g., immunostains) that bind selectively to specific tissue and/or cellular components.

Training machine learning models for analyzing digital pathology images requires a large set of images that are manually labeled with a ground truth. For example, the manual labeling may include identifying a location (e.g., a point location and/or boundary) of each cell of a given type (e.g., tumor cell) within a particular region within the image. Producing these labeled images is tedious and time-consuming to collect. Furthermore, obtaining training images may be difficult due to privacy concerns.

Currently, to collect the ground truth to prepare a training dataset, select images or select portions of images that are to be labeled are randomly selected from a pool of data (e.g., available images). However, randomly picking the images or portions or images to be labeled is not an efficient approach. The images or portions of images that are randomly selected samples may not be the most informative ones in training a machine learning model and may lack depictions of interest. Therefore, labeling randomly selected images or randomly selected portions of images can waste resources (e.g. pathologist time and computational resources involved in model training), without adding any value to the training process.

SUMMARY

Aspects and features of the various embodiments will be more apparent by describing examples with reference to the accompanying drawings, in which:

In some embodiments, a method for active learning in a digital pathology system is provided. A machine learning model is accessed that is configured to use one or more parameters to process images to generate labels. The machine learning model is executed to transform at least part of each of at least one digital pathology image into a plurality of predicted labels; and generate a confidence metric for each of the plurality of predicted labels. An interface is availed that depicts the at least part of the at least one digital pathology image and that differentially represents predicted labels based on corresponding confidence metrics. In response to availing of the interface, label input is received that confirms, rejects, or replaces at least one of the plurality of predicted labels. The one or more parameters of the machine learning model are updated based on the label input.

The method may further include one or more additional actions.

The one or more additional actions may include generating a certainty map for the digital pathology image, where a value for each portion of the digital pathology image corresponds to a statistic of one or more confidence metrics corresponding to point locations or areas within the portion, where availing the interface includes availing a representation of the certainty map.

The interface may be configured to: receive an input to represent statistics pertaining to regional confidence metrics at one magnification level; represent confidence metrics at another magnification level; and receive input to change the magnification level.

The one or more additional actions may include receiving a new digital pathology image; transforming the new digital pathology image into one or more new labels that characterize the new digital pathology image or portions of the new digital pathology image; and outputting the one or more new labels.

The one or more additional actions may include pre-processing an initial version of the digital pathology image to detect a location of each feature of interest, where transforming the at least part of the digital pathology image includes generating a label corresponding to each detected location of interest within the at least part of the digital pathology image.

The one or more additional actions may include selecting, for each of the plurality of predicted labels, a size, color, or shape of a marker based on the confidence metric for the predicted label, where the interface differentially represents predicted labels based on corresponding confidence metrics by representing each predicted label of the plurality of predicted labels using markers using a marker having the selected size, color, or shape.

The machine learning model may include a deep neural network.

In some embodiments, a method is provided that includes determining, by a user, a diagnosis of a subject based on a result generated by a machine learning model trained using part or all of one or more techniques disclosed herein and potentially selecting, recommending and/or administering a particular treatment to the subject based on the diagnosis.

In some embodiments, a method is provided that includes determining, by a user, a treatment to select, recommend and/or administer to a subject based on a result generated by a machine learning model trained using part or all of one or more techniques disclosed herein.

In some embodiments, a method is provided that includes determining, by a user, whether a subject is eligible to participate in a clinical study or to assign the subject to a particular cohort in a clinical study based on a result generated by a machine learning model trained using part or all of one or more techniques disclosed herein.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects and features of the various embodiments will be more apparent by describing examples with reference to the accompanying drawings, in which.

DETAILED DESCRIPTION

Figure 1:
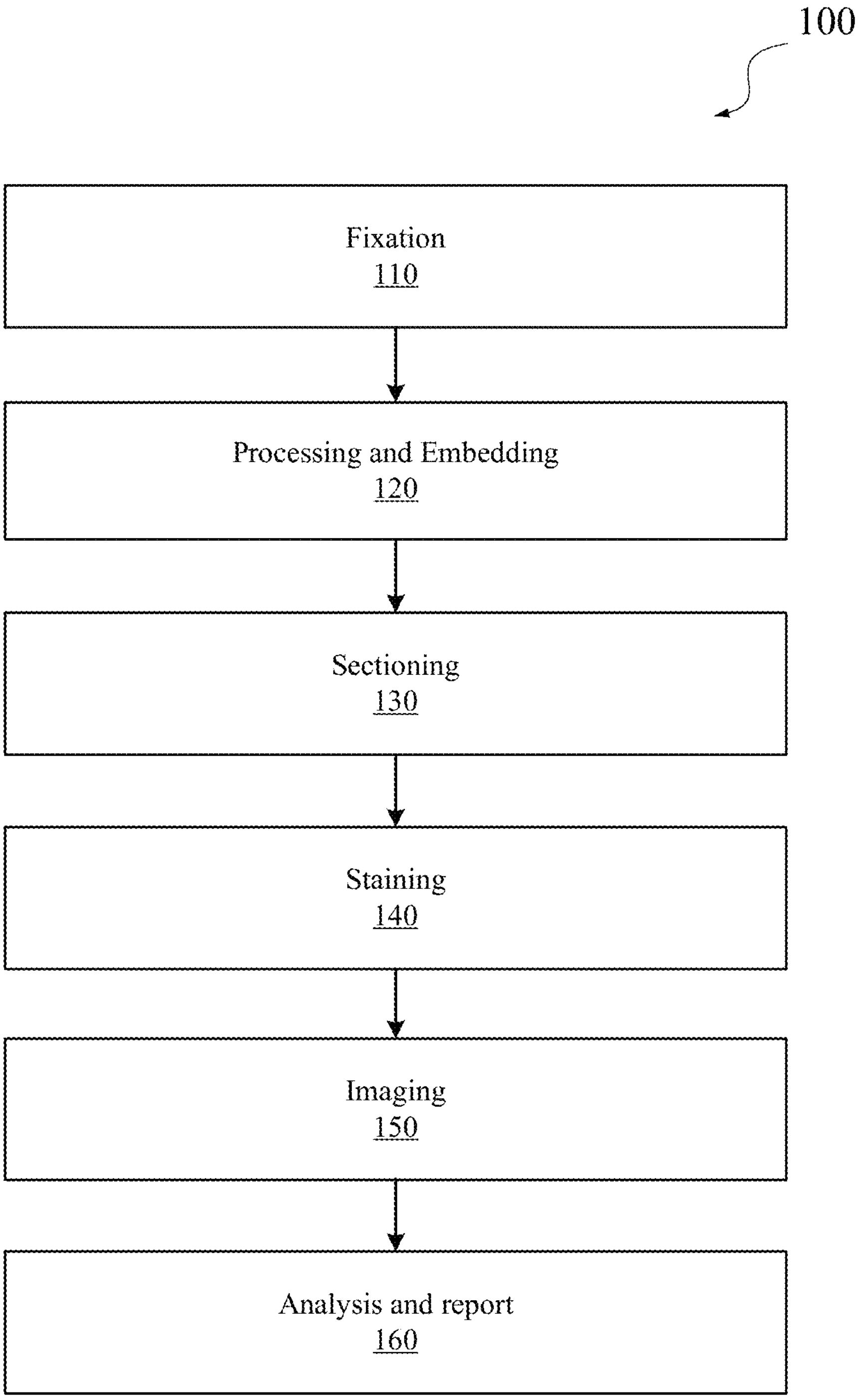
FIG. 1 illustrates an example of a histological staining process.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

I. OVERVIEW

In various embodiments, an active learning system for digital pathology is provided that dynamically selects particular elements within a data set to be labeled for training a machine learning model (e.g., a deep learning or traditional machine learning model). A particular element may include a given slide, a given patch within an image, a given depiction of a cell, etc. The selected particular elements can include an incomplete subset of the elements within a data set (e.g., such that only a fraction of cell depictions are selected for labeling). The selection of the particular elements can support efficiently training the machine learning model to generate accurate predictions. For example, the selection of the particular elements may result in being able to train a model to achieve a threshold accuracy with just a portion (e.g., less than 75%, less than 50% or less than 25%) of labeled data that would be required to achieve the threshold accuracy if data elements were randomly selected for labeling. The use of the active learning system allows for the model to be trained using less labeled data when compared to using randomly selected training data. Furthermore, the selection of particular elements to be labeled and training of the machine-learning model can be iteratively performed, such that weaknesses of the model are repeatedly detected and improved.

The digital pathology active learning system can interact with and/or can be employed by one or more pathologists or one or more imaging scientists. For example, at each of one or more time points, the active learning system may transmit, present or identify the particular elements selected for labeling to a device of a pathologist. The pathologist may then provide input that includes a label, which can then be used to train the machine learning model. The trained machine learning model can then be used to process input data (e.g., provided or identified by an entity who may be the pathologist or a different entity) and generate a label prediction that is output to a device associated with the input data.

In various embodiments, the active learning system includes high-resolution image storage and retrieval, data visualization, interactive data correction, and image analysis for algorithm training and inferencing. An initial labeled data set is used to initially train a machine learning model (a model without any parameters being initialized or a model with parameters being initialized via pre-training or using a random initialization process). The initial labeled data set may include labels for elements that were randomly or pseudo-randomly selected. The model is then used to generate a set of predictions corresponding to other elements.

Each prediction can include a predicted label and a corresponding confidence pertaining to the label. An interface can be availed to a user (e.g., pathologist or imaging scientist) that identifies select elements to be labeled (or for label review) and/or that represents (e.g., using a scaled visual representation or text) a degree to which labeling (or label review) of various elements is predicted to facilitate training relative to others. For example, a heat map that corresponds to a whole slide image can be presented, where the color represents the confidence of predictions associated with various regions within a depicted slice. The interface may allow a user to zoom into a given field of view to magnify particular regions (associated with low confidence metrics) to review predicted labels (e.g., so as to confirm or reject a label, to affirmatively identify a label, etc.). These user inputs can be used to retrain and/or continue training the model (e.g., to update one or more parameters of the model). In some instances, the interface dynamically updates itself such that a user-identified or user-confirmed label is then associated with a high (or maximum confidence) and/or such that elements associated with the lowest confidence metrics (e.g., relative to others in a field of view, in a whole-slide image, or in a data set) are prominently identified (e.g., via a given color, marker type, line type, line width, etc.).

In some instances, the model is periodically further trained based on batches of user input (e.g., that identify element labels or that provide feedback on predicted labels). In this case, an interface may be periodically updated or periodically provided to identify predicted labels generated based on outputs from a most recent version of the model.

The iteration between generation of predicted labels, provision of user feedback corresponding to the most uncertain predictions, and retraining the model can continue for a predefined period of time, for a predefined number of iterations or until the model reaches the desired performance (at which point, the model can be deployed). The iteration may be continued later in order to further fine-tune the classifier.

A high-performance image server can support one or more applications for building, training and/or using the model. Results from training and inferencing the model can be generated and stored at scale in a data store. APIs can enable the interaction between a controller of the model (that trains and/or executes the model) and the data store. An integrated platform may be used to integrate all of these components and allows the user to train models within a web browser.

II. DEFINITIONS

As used herein, when an action is "based on" something, this means the action is based at least in part on at least a part of the something.

As used herein, the terms "substantially," "approximately," and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 2, 5, and 20 percent.

As used herein, the term "sample," "biological sample," or "tissue sample" refers to any sample including a biomolecule (such as a protein, a peptide, a nucleic acid, a lipid, a carbohydrate, or a combination thereof) that is obtained from any biological material and/or organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biological material or structure" refers to natural materials or structures that comprise a whole or a part of a living structure (e.g., a cell nucleus, a cell membrane, cytoplasm, a chromosome, DNA, a cell, a cluster of cells, or the like).

As used herein, a "digital pathology image" refers to a digital image of a stained sample.

As used herein, the term "artifact" refers to an artificial structure or tissue alteration in a prepared microscopic slide as a result of an extraneous factor. Artifacts may occur during, for example, surgical removal, fixation, tissue processing, embedding, sectioning, staining, and mounting procedures. Artifacts in histopathology may include, for example, pre-fixation artifacts, fixation artifacts, artifacts related to bone tissue, tissue-processing artifacts, artifacts related to microtomy, artifacts related to floatation and mounting, staining artifacts, mounting artifacts, biological artifacts, imaging artifacts, and the like. For example, pre-fixation artifacts may include injection artifacts, squeeze artifacts (e.g., tissue tear or tissue folds), Fulguration artifacts, starch artifacts, autolysis artifacts, and the like. Fixation artifacts may include, for example, formalin pigments, mercury pigments, ice-crystal artifacts, freezing artifacts, streaming artifacts, and the like. Artifacts related to floatation and mounting may include, for example, folds and wrinkles in section, contaminations, air bubbles, and the like. Staining artifacts may include, for example, residual wax, artifacts related to addition of acetic acid to eosin, artifacts due to mordent of hematoxylin, artifacts due to fluorescent sheen of hematoxylin, and the like. Mounting artifacts may include, for example, residual water and air bubbles.

III. GENERATION OF DIGITAL PATHOLOGY IMAGES

Histological staining is widely used to highlight features of interest and enhance contrast in sectioned tissues or cells of a biological sample. For example, staining may be used to mark particular types of cells and/or to flag particular types of nucleic acids and/or proteins to aid in the microscopic examination. The stained sample can then be assessed to determine or estimate a quantity of features of interest in the sample (e.g., which may include a count, density or expression level) and/or one or more characteristic of the features of interest (e.g., locations of the features of interest relative to each other or to other features, shape characteristics, etc.). The process of histological staining may include several stages, such as fixation, processing, embedding, sectioning, staining, and imaging.

In some embodiments, an immunohistochemistry staining of tissue sections is a type of histological staining used to identify presence of a particular protein in the biological sample. For example, expression level of a particular protein (e.g., an antigen) is determined by: (a) performing an immunohistochemistry analysis of a sample with a particular antibody type; and (b) determining the presence and/or expression level of the protein in the sample. In some embodiments, immunohistochemistry staining intensity is determined relative to a reference determined from a reference sample (e.g., a control cell line staining sample, a tissue sample from non-cancerous subject, a reference sample known to have a pre-determined level of protein expression).

FIG. 1 illustrates an example of a histological staining process 100. Stage 110 of histological staining process 100 includes sample fixation, which may be used to preserve the sample and slow down sample degradation. In histology, fixation generally refers to an irreversible process of using of chemicals to retain the chemical composition, preserve the natural sample structure, and maintain the cell structure from degradation. Fixation may also harden the cells or tissues for sectioning. Fixatives may enhance the preservation of samples and cells using cross-linking proteins. The fixatives may bind to and cross-link some proteins, and denature other proteins through dehydration, which may harden the tissue and inactivate enzymes that might otherwise degrade the sample. The fixatives may also kill bacteria.

The fixatives may be administered, for example, through perfusion and immersion of the prepared sample. Various fixatives may be used, including methanol, a Bouin fixative and/or a formaldehyde fixative, such as neutral buffered formalin (NBF) or paraffin-formalin (paraformaldehyde-PFA). In cases where a sample is a liquid sample (e.g., a blood sample), the sample may be smeared onto a slide and dried prior to fixation.

While the fixing process may serve to preserve the structure of the samples and cells for the purpose of histological studies, the fixation may result in concealing of tissue antigens thereby decreasing antigen detection. Thus, the fixation is generally considered as a limiting factor for immunohistochemistry because formalin can cross-link antigens and mask epitopes. In some instances, an additional process is performed to reverse the effects of cross-linking, including treating the fixed sample with citraconic anhydride (a reversible protein cross-linking agent) and heating.

Stage 120 of histological staining process 100 includes sample processing and embedding. Sample processing may include infiltrating a fixed sample (e.g., a fixed tissue sample) with a suitable histological wax, such as paraffin wax. The histological wax may be insoluble in water or alcohol, but may be soluble in a paraffin solvent, such as xylene. Therefore, the water in the tissue may need to be replaced with xylene. To do so, the sample may be dehydrated first by gradually replacing water in the sample with alcohol, which can be achieved by passing the tissue through increasing concentrations of ethyl alcohol (e.g., from 0 to about 100%). After the water is replaced by alcohol, the alcohol may be replaced with xylene, which is miscible with alcohol. Embedding may include embedding the sample in warm paraffin wax. Because the paraffin wax may be soluble in xylene, the melted wax may fill the space that is filled with xylene and was filled with water before. The wax filled sample may be cooled down to form a hardened block that can be clamped into a microtome for section cutting. In some cases, deviation from the above example procedure results in an infiltration of paraffin wax that leads to inhibition of the penetration of antibody, chemical, or other fixatives.

Stage 130 of histological staining process 100 includes sample sectioning. Sectioning is the process of cutting thin slices of a sample (e.g., an embedded and fixed tissue sample) from an embedding block for the purpose of mounting it on a microscope slide for examination. Sectioning may be performed using a microtome. In some cases, tissues can be frozen rapidly in dry ice or Isopentane, and can then be cut in a refrigerated cabinet (e.g., a cryostat) with a cold knife. Other types of cooling agents can be used to freeze the tissues, such as liquid nitrogen. The sections for use with light microscopy are generally on the order of 4-10 μm thick. In some cases, sections can be embedded in an epoxy or acrylic resin, which may enable thinner sections (e.g., <2 μm) to be cut. The sections may be placed on glass slides.

Stage 140 of histological staining process 100 includes staining (of sections of tissue samples or of fixed liquid samples). The purpose of staining is to identify different sample components through the color reactions. Most cells are colorless and transparent. Therefore, histological sections may need to be stained to make the cells visible. The staining process generally involves adding a dye or stain to a sample to qualify or quantify the presence of a specific compound, a structure, a molecule, or a feature (e.g., a subcellular feature). For example, stains can help to identify or highlight specific biomarkers from a tissue section. In other example, stains can be used to identify or highlight biological tissues (e.g., muscle fibers or connective tissue), cell populations (e.g., different blood cells), or organelles within individual cells.

Many staining solutions are aqueous. Thus, to stain tissue sections, wax may need to be dissolved and replaced with water (rehydration) before a staining solution is applied to a section. For example, the section may be sequentially passed through xylene, decreasing concentration of ethyl alcohol (from about 100% to 0%), and water. Once stained, the sections may be dehydrated again and placed in xylene. The section may then be mounted on microscope slides in a mounting medium dissolved in xylene. A coverslip may be placed on top to protect the sample section. The evaporation of xylene around the edges of the coverslip may dry the mounting medium and bond the coverslip firmly to the slide.

Various types of staining protocols may be used to perform the staining. For example, an exemplary immunohistochemistry staining protocol includes using a hydrophobic barrier line around the sample (e.g., tissue section) to prevent leakage of reagents from the slide during incubation, treating the tissue section with reagents to block endogenous sources of nonspecific staining (e.g., enzymes, free aldehyde groups, immunoglobins, other irrelevant molecules that can mimic specific staining), incubating the sample with a permeabilization buffer to facilitate penetration of antibodies and other staining reagents into the tissue, incubating the tissue section with a primary antibody for a period of time (e.g., 1-24 hours) at a particular temperature (e.g., room temperature, 6-8° C.), rinsing the sample using wash buffer, incubating the sample (tissue section) with a secondary antibody for another period of time at another particular temperature (e.g., room temperature), rinsing the sample again using water buffer, incubating the rinsed sample with a chromogen (e.g., DAB), and washing away the chromogen to stop the reaction. In some instances, counterstaining is subsequently used to identify an entire "landscape" of the sample and serve as a reference for the main color used for the detection of tissue targets. Examples of the counterstains may include hematoxylin (stains from blue to violet), Methylene blue (stains blue), toluidine blue (stains nuclei deep blue and polysaccharides pink to red), nuclear fast red (also called Kernechtrot dye, stains red), and methyl green (stains green); non-nuclear chromogenic stains, such as eosin (stains pink), etc. A person of ordinary skill in the art will recognize that other immunohistochemistry staining techniques can be implemented to perform staining.

In another example, an H&E staining protocol can be performed for the tissue section staining. The H&E staining protocol includes applying hematoxylin stain mixed with a metallic salt, or mordant to the sample. The sample can then be rinsed in a weak acid solution to remove excess staining (differentiation), followed by bluing in mildly alkaline water. After the application of hematoxylin, the sample can be counterstained with eosin. It will be appreciated that other H&E staining techniques can be implemented.

In some embodiments, various types of stains can be used to perform staining, depending on which features of interest is targeted. For example, DAB can be used for various tissue sections for the IHC staining, in which the DAB results a brown color depicting a feature of interest in the stained image. In another example, alkaline phosphatase (AP) can be used for skin tissue sections for the IHC staining, since DAB color may be masked by melanin pigments. With respect to primary staining techniques, the applicable stains may include, for example, basophilic and acidophilic stains, hematin and hematoxylin, silver nitrate, trichrome stains, and the like. Acidic dyes may react with cationic or basic components in tissues or cells, such as proteins and other components in the cytoplasm. Basic dyes may react with anionic or acidic components in tissues or cells, such as nucleic acids. As noted above, one example of a staining system is H&E. Eosin may be a negatively charged pink acidic dye, and hematoxylin may be a purple or blue basic dye that includes hematein and aluminum ions. Other examples of stains may include periodic acid-Schiff reaction (PAS) stains, Masson's trichrome, Alcian blue, van Gieson, Reticulin stain, and the like. In some embodiments, different types of stains may be used in combination.

Stage 150 of histological staining process 100 includes medical imaging. A microscope (e.g., an electron or optical microscope) can be used to may magnify the stained sample. For example, optical microscopes may have a resolution less than 1 μm, such as about a few hundred nanometers. To observe finer details in nanometer or sub-nanometer ranges, electron microscopes may be used. A digital image of the magnified sample may be captured using a digital camera (e.g., integrated with or connected to the microscope). The digital image can include a whole-slide image that depicts an entire slide and/or an entire stained tissue slice.

At stage 160, the images of the stained sections are stored. The images may be stored locally, remotely, and/or in a cloud server. Each image may be stored in association with an identifier of a subject and a date (e.g., a date when a sample was collected and/or a date when the image was captured). An image may further be transmitted to another system (e.g., a system associated with a pathologist or an automated or semi-automated image analysis system).

It will be appreciated that modifications to process 100 are contemplated. For example, if a sample is a liquid sample, stage 120 (processing and embedding) and/or stage 130 (sectioning) may be omitted from the process.

IV. EXEMPLARY PROCESS FLOW FOR DIGITAL PATHOLOGY IMAGE TRANSFORMATION

Figure 2:
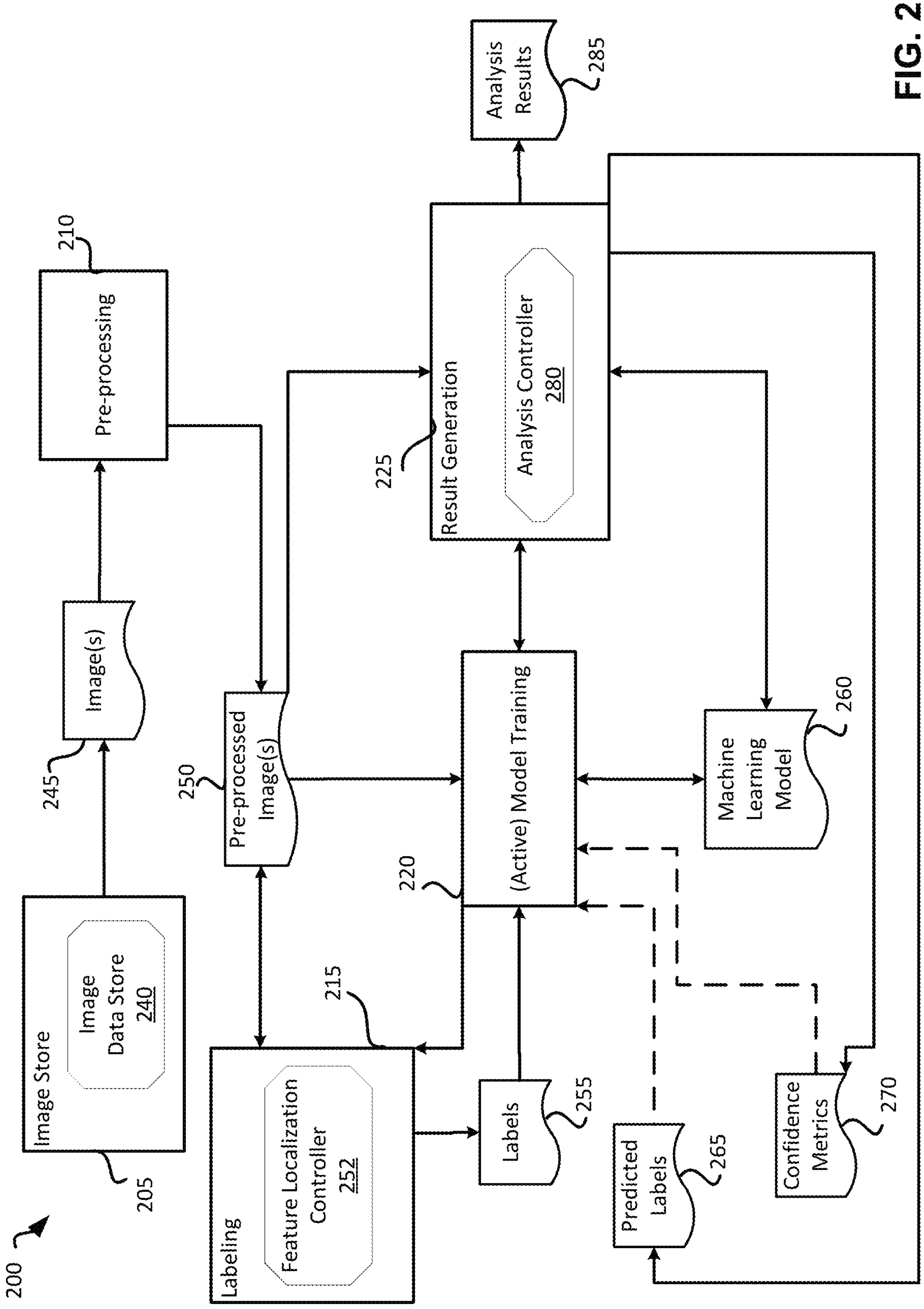
FIG. 2 illustrates a process flow (performed using one or more computing systems) for processing digital pathology images using a machine-learning model.

FIG. 2 illustrates a process flow 200 (performed using one or more computing systems) for processing digital pathology images using a machine-learning model. As further described herein, processing a digital pathology image can include using the digital pathology image to train the machine-learning model or transforming part or all of the digital pathology image into one or more results using a trained (or partly trained) version of the machine learning model.

As shown in FIG. 2, process flow 200 includes several stages: an image store stage 205, a pre-processing stage 210, a labeling stage 215, an (active) model training stage 220, and a result generation stage 225.

The image store stage 205 may include one or more image data stores 260 that are accessed (e.g., by pre-processing stage 210) to provide a set of digital images 245 of preselected areas from or the entirety of the biological sample slides (e.g., tissue slides). Each digital image 245 stored in each image data store 260 and accessed at image store stage 210 may include a digital pathology image generated in accordance with part or all of process 100 depicted in FIG. 1.

At the pre-processing stage 210, each of one, more, or all of the set of digital images 245 are preprocessed using one or more techniques to generate a corresponding pre-processed image 250. The preprocessing may comprise cropping the images. In some instances, the preprocessing may further comprise standardization or rescaling (e.g., normalization) to put all features on a same scale (e.g., a same size scale or a same color scale or color saturation scale). In certain instances, the images are resized with a minimum size (width or height) of predetermined pixels (e.g., 2500 pixels) or with a maximum size (width or height) of predetermined pixels (e.g., 3000 pixels) and kept with the original aspect ratio.

In some instances, preprocessing includes localizing and/or segmenting each feature of interest within a digital image. Localizing a feature of interest may include predicting a point location and/or boundary for the image. For example, the localization may include predicting a point location corresponding to each depicted nucleus or predicting a closed shape corresponding to each depicted cell membrane. The feature localization may be performed automatically using one or more automated detection techniques.

In some instances, a localization is performed (by a feature localization controller 252) semi-automatically or automatically. For example, intensities across an image (e.g., a preprocessed image) may be normalized or regularized, intensities may be thresholded or filtered, and/or an algorithm (e.g., configured to detect objects, lines and/or shapes) may be applied. Each boundary output and/or point location may then be identified as a feature of interest. In some instances, a metric is associated with each feature of interest (e.g., a metric indicating a confidence of locating the feature of interest), and a level of interest may scale based on the metric.

In some instances, a localization is performed using another image corresponding to the pre-processed image 250 or using a different pre-processed image corresponding to a same base image 245. For example, for a given digital pathology image, a given pre-processing action may be performed to accentuate a color corresponding to a dye that is absorbs by a nucleus or cellular membrane, and the pre-processed image may be used to localize cells. Meanwhile, a different pre-processing may be used to ensure that other organelles are depicted when each depicted cell is to be classified (e.g., via labeling or using a machine learning model) as a given cell type. As another example, sequential slices of a sample may be stained using different stains, such that some of the slices are stained to facilitate localization of features of interest (e.g., using H&E staining to facilitate detection of cells) and adjacent slices are stained to facilitate cell classification via staining of different biomarkers. In this case, localizations of features of interest may be mapped, translated, and/or mapped from the image used to identify the localizations to the image to be used for labeling.

Some pre-processed images 250 are partly or fully labeled at labeling stage 215. A label assigned at labeling stage 215 is a "ground-truth" label identified based on input from a human user (e.g., pathologist or image scientist). Thus, labeling stage can include transmitting and/or presenting part or all of one or more pre-processed images to a device operated by the user. In some instances, labeling stage 215 includes availing an interface (e.g., using an API) to be presented at the device operated by the user, where the interface includes an input component to accept input that identifies the label. For example, the input component may include a drop-down menu, radio-button menu, text box (e.g., configured to receive one or more characters), pencil tool (e.g., configured to identify a point location, curved line, boundary, etc.), etc.

In some instances, the interface may identify which and/or a degree to which particular label(s) are being requested, which may be conveyed via (for example) text instructions and/or a visualization. For example, a particular color, size and/or symbol may represent that a label is being requested for a particular depiction (e.g., a particular cell or region) within the image relative to other depictions. If labels corresponding to multiple depictions are to be requested, the interface may concurrently identify each of the depictions or may identify each depiction sequentially (such that provision of a label for one identified depiction triggers an identification of a next depiction for labeling).

In some instances, each image is presented until the user has identified a specific number of labels (e.g., of a particular type). For example, a given whole-slide image or a given patch of a whole-slide image may be presented until the user has identified 15 point locations, each corresponding to a depiction of a macrophage, at which point the interface may present an image of a different whole-slide image or different patch (e.g., until a threshold number of images or patches are labeled). Thus, in some instances, the interface is configured to request and/or accept labels for an incomplete subset of features of interest, and the user may determine which of potentially many depictions will be labeled.

The interface may support zooming in and out of the image (e.g., to magnify various fields of view or revert towards a whole-slide scale) and/or moving the image. In some instances, at a low level of magnification, portions of the image for which labels are requested may be identified using one type of visual identifier (e.g., a color map), while—at a high level of magnification—portions of the image for which labels are requested may be alternatively or additionally identified using another type of visual identifier (e.g., marker symbol, marker size, and/or marker shape). In some instances, a characteristic of a visual indicator of portions of the image for which labels are requested changes with magnification. For example, a size of marker of point locations may be correlated with a magnification level.

A label 255 identified at labeling stage 215 may identify (for example) a classification of a cell, a binary indication as to whether a given cell is a particular type of cell, a binary indication as to whether the pre-processed image 250 (or a particular region with the pre-processed image 250) includes a particular type of depiction (e.g., necrosis or an artifact), a categorical characterization of a slide-level or region-specific depiction (e.g., that identifies a specific type of artifact), a number (e.g., that identifies a quantity of a particular type of cells within a region, a quantity of depicted artifacts, or a quantity of necrosis regions), etc. In some instances, a label 255 includes a location. For example, a label 255 may identify a point location of a nucleus of a cell of a particular type or a point location of a cell of a particular type. As another example, a label 250 may include a border or boundary, such as a border of a depicted tumor, blood vessel, necrotic region, etc. Depending on a feature of interest, a given labeled pre-processed image 250 may be associated with a single label 255 or multiple labels 255. In the latter case, each label 255 may be associated with (for example) an indication as to which position or portion within the pre-processed image 250 the label corresponds.

At labeling stage 215, labels 255 and corresponding pre-processed images 250 can be used to train a machine learning model 260. Machine learning model 260 include (for example) a convolutional neural network ("CNN"), a deep neural network, an inception neural network, a residual neural network ("Resnet"), a U-Net, a V-Net, a single shot multibox detector ("SSD") network, a recurrent neural network ("RNN"), a rectified linear unit ("ReLU"), a long short-term memory ("LSTM") model, a gated recurrent units ("GRUs") model, the like, or any combination thereof. The machine learning model may include a decision tree model, random forest model, support vector machine, and/or regression model.

The machine learning model may include and/or be configured using one or more hyperparameters that are fixed (e.g., and defined by a programmer). For example, a hyperparameter may define a number of layers in a neural network, a number of nodes in a layer, a learning rate, etc.

Training the machine learning model 260 can include learning a set of parameters (e.g., one or more coefficients and/or weights) using a loss function or objective function (e.g., to minimize a loss or maximize an objective). Each parameter may be a tunable variable, such that a value for the parameter is adjusted during training. For example, a loss function or objective function may be configured to optimize accurate classification of depicted representations, optimize characterization of a given type of feature (e.g., characterizing a shape, size, uniformity, etc.), optimize detection of a given type of feature, and/or optimize accurate localization of a given type of feature.

Training at any stage may involve requesting that a human user label an incomplete subset of available data. In some instances, during a first training iteration, the subset may be identified using a random or pseudo-random computational algorithm or by requesting that the user select the subset to be labeled.

With respect to a first training iteration, the machine learning model 260 may be (but need not have been) initialized with parameter values set randomly or pseudo-randomly prior to an initial training. In some instances, initial parameter values are defined using transfer learning, where the parameters were learned for another task. In some instances, parameters are defined using transfer learning in lieu of an initial training stage that involves random, pseudo-random, or completely deferential user selection of a subset of multiple features to be labeled.

With respect to a subsequent iteration, parameters may be set in accordance with parameter definitions from a previous iteration, and training performed at (active) model training stage 220 may become more active in selecting or prioritizing data to be labeled at labeling stage 215. More specifically, because at least temporary definitions for parameters for the machine learning model 260 are identified by a first (or subsequent) iteration, the model 260 can then be used at result generation stage 225 to transform other pre-processed images 250 into predicted labels 265. Each predicted label 265 can be associated with an image and/or portion of an image used to generate the predicted label 265 and also with a confidence metric 270.

An interface availed to a device of a user (e.g., to a pathologist) may identify or present images portions of images that are associated with low confidence metrics (e.g., below a predefined absolute or relative threshold). For example, when labels correspond to whole images, active model training may include presenting a predefined number of images associated with the lowest confidence metrics 270 from a given training iteration and/or presenting all images associated with confidence metrics 270 from a given training iteration that are below a predefined threshold. As another example, an initial group of images associated with confidence metrics 270 from a given training iteration that are below a predefined threshold can be identified, and a subset (having a predefined quantity of images) of the initial group of images can be randomly or pseudo-randomly selected and presented.

The interface may include one or more features as described herein to facilitate labeling. For example, the interface may have one or more input components to accept input identifying a label and/or zoom capabilities. As another example, the interface may use color (e.g., via a heatmap) or other visual indicator to indicate for which portion(s) of an image a label or a label review is requested. The interface may present each image or each image portion in association with an indication of a corresponding predicted label 265. For example, a color of a marker identifying a point location of an image portion may identify a value for a binary or categorical predicted label. As another example, a textual heading or overlay may identify a predicted label for an image.

In some instances, rather than selecting images or portions of images for labeling or label review, an interface is configured to support labeling or label review for all images used to train a model in a given training images or for all portions of one or more images. For example, the interface may concurrently or sequentially present a visual identifier for each of many predicted labels 265 and may accept input for any such predicted label 265 that confirms or rejects the predicted label 265. In this instance, the interface nonetheless may emphasize predicted labels associated with low or relatively low confidence and/or may expressly request label review for predicted labels associated with low or relatively low confidence. For example, a marker may be overlaid on each portion of an image in a field of view. A color of the marker may represent a predicted label 265, and a size of the marker may be inversely correlated with a corresponding confidence metric 270.

When a user interacts with the interface to identify a new label for an image portion or image, the new label is considered to be a ground-truth label 255 for the image portion or image. When a user interacts with the interface to confirm a given predicted label for an image portion or image, a ground-truth label 255 for the image portion or image is defined to be the predicted label. When a user interacts with the interface to reject a predicted label and if only two potential labels are available (meaning that the labeling is binary), a ground-truth label 255 for the image portion or image is defined to be the other of the two potential labels.

The new ground-truth labels 255 can then be used to train machine learning model 260 during a next training iteration. For example, machine learning model 260 may be initialized with parameter values learned during a previous iteration, and the model may then be trained using the new ground-truth labels 255. As another example, machine learning model 260 may be retrained using labels 255 identified in association with multiple labeling sessions and/or with multiple training iterations, though labels 255 associated with a most recent labeling session may be more highly weighted that other labels.

The iteration between generation of predicted labels 265 and confidence metrics 270 (at result generation stage 225), providing an interface that facilitates labeling or label review of low-confidence predictions, and training machine learning model 260 using new labels can continue until a stopping condition is satisfied. The training-completion condition may be configured to be satisfied when (for example) a predefined number of iterations have been completed, a statistic generated based on confidence metrics 270 (e.g., an average or median confidence metric or a percentage of confidence metrics that are above a particular value) exceeds a predefined confidence threshold, a percentage of labels that were both reviewed and rejected in a most recent label review falls below a predefined label-rejection threshold, and/or a user device that had been engaged in label review closes a label-review application. In some instances, a new training iteration may be initiated in response to receiving a corresponding request from a user device.

The trained machine learning model 260 can then be used (at result generation stage 225) to process new pre-process images 250 to generate new predicted labels 265 and potentially new confidence metrics 270. The new predicted labels (and potentially the new confidence metrics 270) may be presented using a same or similar type of interface that had been used for initial labeling or for label review. In various instances, an interface that presents the new predicted labels may include or may lack an input component to reject or replace a predicted label 265.

In some instances, an analysis controller 280 generates one or more analysis results 285 that are availed to an entity that requested processing of an underlying image. Analysis result(s) 285 may be provided instead of or in addition to predicted labels 265. Analysis result(s) 285 may be based on the predicted labels. For example, an analysis result 285 may identify a count or percentage of depicted cells associated with a particular label.

It will be appreciated that process flow 200 is exemplary, and process flows 200 with different stages and/or using components are contemplated. For example, in some instances, a network may omit pre-processing stage 210, such that the images used to train a model and/or an image processed by a model are raw images (e.g., from image data store). As another example, it will be appreciated that each of pre-processing stage 210 and (active) model training stage 220 can include a controller to perform one or more actions described herein. Similarly, while labeling stage 215 is depicted in association with feature localization controller 252 and while result generation stage 225 is depicted in association with analysis controller 280, a controller associated with each stage may further or alternatively facilitate other actions described herein other than feature localization and/or generation of analysis results. As yet another example, the depiction of process flow 200 shown in FIG. 2 lacks a depicted representation of a device associated with a programmer (e.g., that selected an architecture for machine learning model 260, defined how various interfaces would function, etc.), a device associated with a user providing initial labels or label review (e.g., at labeling stage 215), and a device associated with a user requesting model processing of a given image (which may be a same user or a different user as one who had provided initial labels or label reviews). Despite the lack of the depiction of these devices, process flow 200 may involve the use one, more or all of the devices and may, in fact, involve the use of multiple devices associated with corresponding multiple users providing initial labels or label review and/or multiple devices associated with corresponding multiple users requesting model processing of various images.

IV.A. Exemplary Training of Model to Label Portions of Whole-Slide Images

Figure 3:
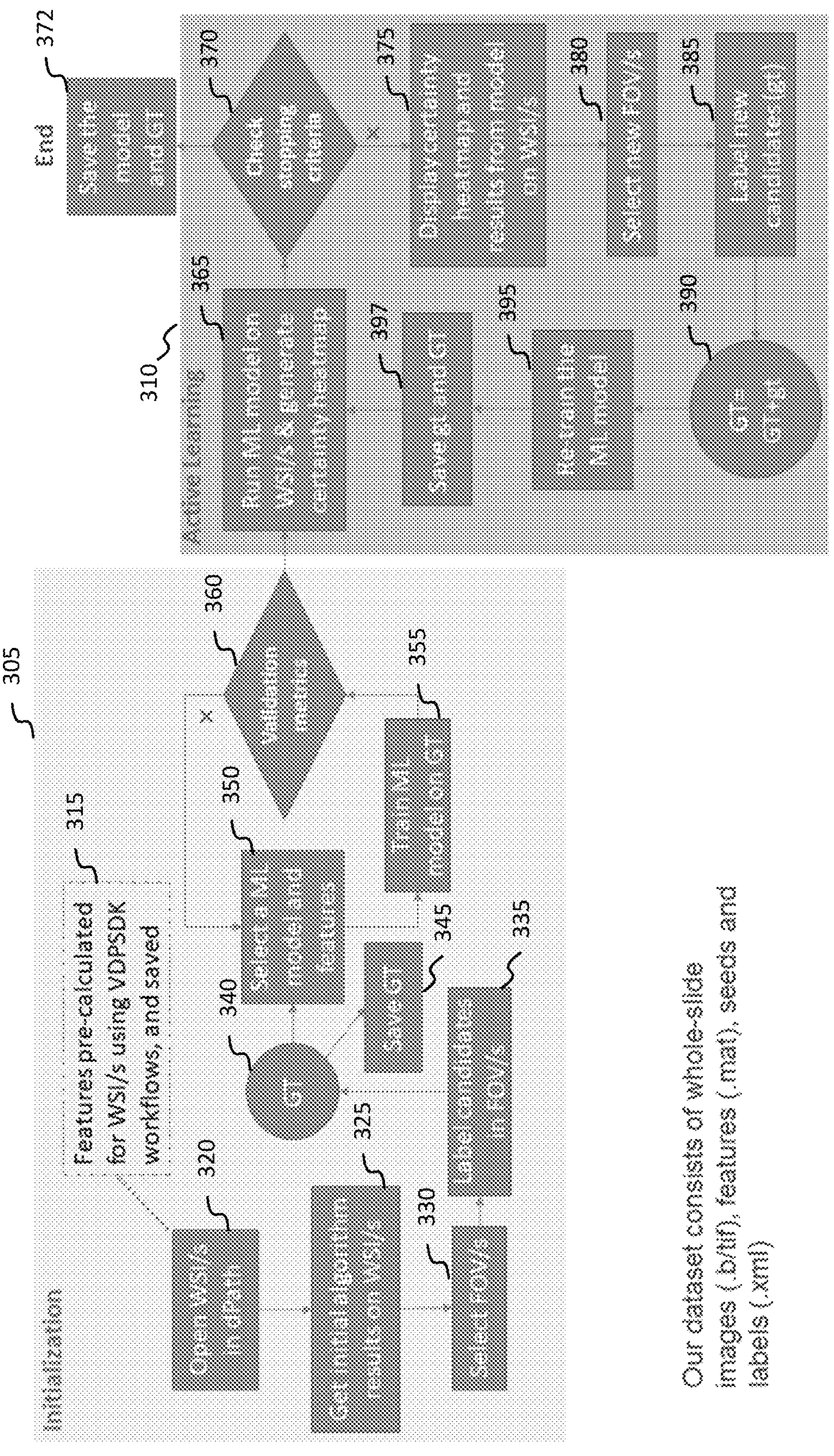
FIG. 3 illustrates an active learning workflow according to some aspects of the present disclosure.

FIG. 3 illustrates an active learning workflow 300 according to some aspects of the present disclosure. Actions represented in active learning workflow 300 may be performed using one or more computing systems (e.g., a model-training computing system and/or one or more devices of one or more users providing labels or label reviews). Some or all of the actions performed in active learning workflow 300 may be performed during labeling stage 215 and/or (active) model training stage 220 of process flow 200 (depicted in FIG. 2).

Active learning workflow includes both initialization actions 305 and active learning actions 310. In this exemplary instance, at block 315, a pre-processing action is performed to detect features in a whole-slide image (e.g., using a framework as represented as VDPSDK, which can support running a set of commands or scripts in a specific order). A feature may include (for example) a cell, artifact, nucleus, etc.

At block 320, one or more whole slide images are opened. Opening a whole slide image may include loading the whole slide image from local or remote storage onto a user device. The whole slide image may be opened in response a user (e.g., a pathologist, image scientist, or other suitable user) having provided a particular type of input (e.g., initiating a session and/or identifying the whole slide image) within a viewing software. Opening the whole-slide image may trigger the whole-slide image to be presented at the user device.

At block 325, results from an initial algorithm are accessed, where the results correspond to the whole slide image(s). The initial algorithm can include a machine learning model, which may include a model initialized with randomly selected parameter values or pseudo-randomly selected parameter values. The initial algorithm may include a machine learning model with parameter values defined using transfer learning (i.e., having been learned in a context corresponding to a different task). The results may include one or more predicted labels.

At block 330, one or more fields of views (FOV) are selected. Each field of view may identify a portion of the whole slide image. The field(s) of view may be automatically selected (e.g., using a random or pseudorandom technique or using a predefined order) or may be selected based on user input (e.g., clicking on a portion of a presentation of the whole slide image or selecting a region of the whole slide image). Selection of the field of view(s) may cause the field(s) of view to be presented at the user device (e.g., instead of or in addition to the whole-slide image).

At block 335, one, more, or all of the features of interest (identified at block 315) that are present in the field(s) of view are labeled. Each of the labels may be defined based on an input received from the user. Each of these labels can be defined to be a ground-truth label 340, which is saved in association with data about the corresponding feature at block 345.

At block 350, a machine-learning model and features (e.g., one or more nuclear features, one or more cellular features, one or more morphological features, and/or one or more architectural features) to be used for training are selected. For example, the selection may be made based on input received at the user device that identifies a particular type of model from among multiple types of models presented in a list, pull-down menu, etc. The features may be selected automatically or based on user input. Each of the multiple types of models may differ with respect to each other with regard to model architecture, parameter initialization (e.g., determined based on training in a different context), etc. The selection may further include defining one or more hyperparameters of the model (e.g., based on input received at the user device). As another example, a model may be selected from among multiple models randomly, pseudo-randomly or using a predefined order.

At block 355, the selected machine learning model is trained using the ground-truth labels 340 and the corresponding parts of the field(s) of view. In some instances, the ground-truth labels are divided into two subsets—a first subset for training the model (at block 355) and a second subset for validation. One or more validation metrics can be calculated using the second subset of ground-truth labels and, at block 360, it may be determined whether the validation metric(s) indicate at least a baseline performance quality. If not, workflow 300 can return to block 350, where another model can be selected.

When it is determined that the validation metric(s) indicate at least a baseline performance quality, workflow 300 transitions to the active learning actions 310.

At block 365, the machine learning model selected at block 350 and with parameters learned at block 355 is run on a same or new whole-slide image. The machine learning model can output a predicted label and a corresponding confidence metric corresponding to each of multiple point locations within the image or to each of multiple portions within the regions. The confidence metrics can be used to generate (also at block 365) a heatmap that corresponds to a portion of the whole-slide image or the entire whole-slide image, where the heatmap represents certainties (e.g., confidence metrics) of predicted labels across different parts the depicted area. For example, a heatmap may be generated by using a smoothing technique or by calculating a statistic for each of multiple regions.

At block 370, it is determined whether the machine learning model is sufficiently trained. If so, the model is saved at block 372, along with all ground-truth labels used to train the model.

If not, the certainty heatmap is displayed (e.g., at a user device), as are results (predicted label(s)) at 375 generated by the machine learning model (from block 365). In some instances, the heatmap and results are displayed concurrently. For example, a visual indicator of each prediction may be overlaid on the heatmap at a position associated with a corresponding feature of interest. As another example, a heatmap (e.g., of a whole-slide image or for a given field of view) may be concurrently presented with the results in a non-overlapping manner (e.g., in two frames). In some instances, a heatmap is presented across a first set of magnification levels, and results are presented across a second set of magnification levels (where the first set of magnification levels may overlap or may be non-overlapping with the second set of magnification levels).

At block 380, a new field of view is selected (e.g., in response to detecting corresponding input at a user device at which the heatmap had been displayed). At block 385, one or more features of interest are labeled, thereby creating one or more additional ground-truth labels (gt). Thus, as shown at block 390, a total set of ground-truth labels (G) can be defined to include the ground-truth labels from the initialization actions 305 and each additional ground-truth label identified via active learning actions 310.

At block 395, the machine-learning model is re-trained using the total set of ground-truth labels. At block 397, the total set of ground-truth labels is stored (e.g., replacing any previously stored total set of ground-truth labels) and/or the newly obtained labels (from block 385) are stored to supplement previously stored ground-truth labels. The model can continue to be trained until it is determined (at block 370) that a stopping criteria is satisfied.

IV.B. Exemplary Workflow for Using Digital Pathology Process Flows

Figure 4:
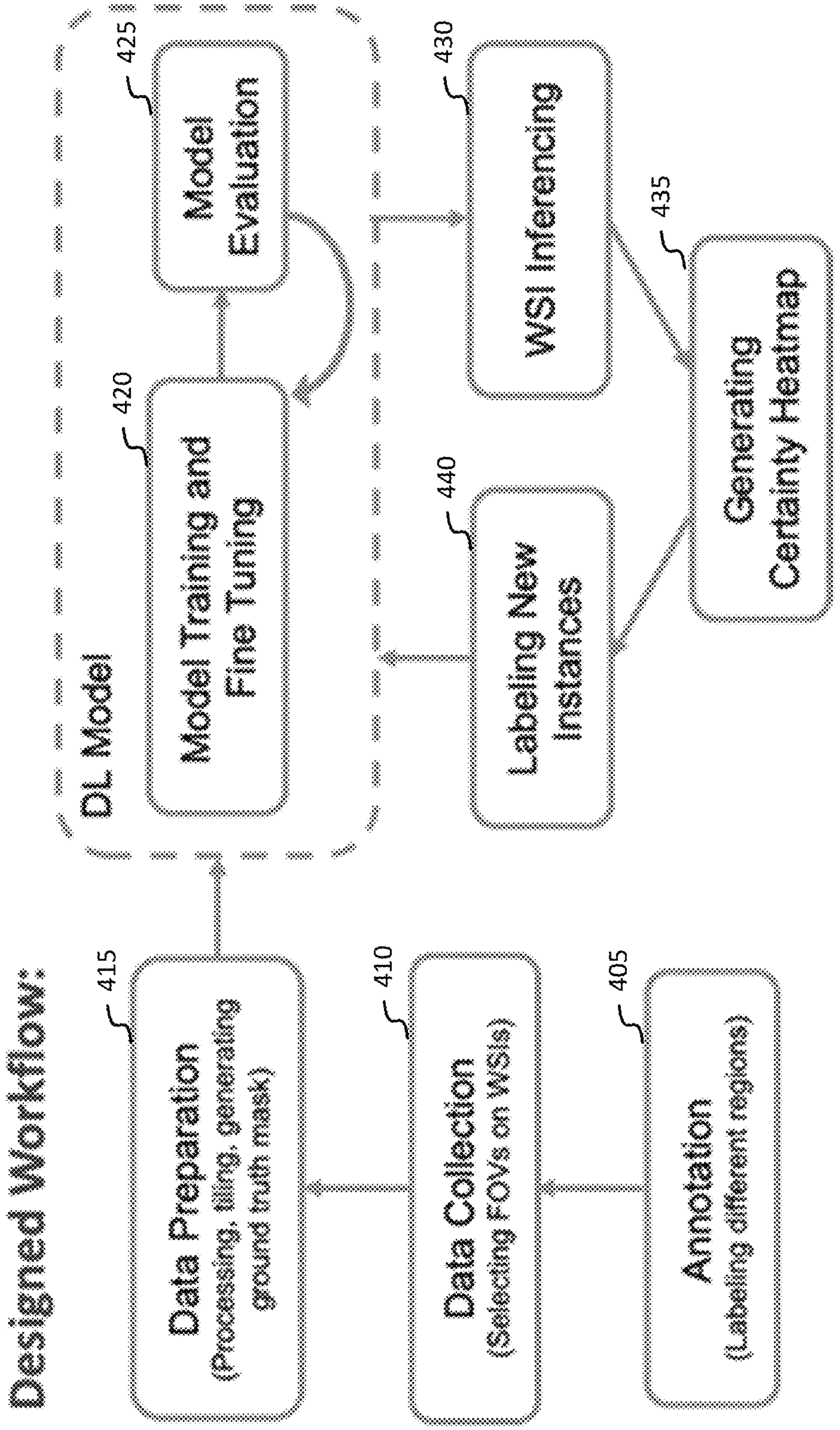
FIG. 4 illustrates an exemplary workflow for using part or all of a digital pathology process flow.

FIG. 4 illustrates an exemplary workflow for using part or all of a digital pathology process flow (e.g., process flow 200, depicted in FIG. 2). The depicted workflow may be performed on one or more computing systems (e.g., a computing system associated with a human annotator, a computing system associated with a user requesting a label prediction and/or a remote computing system (e.g., operating in the cloud).

At block 405, part or all of an image (e.g., part or all of a whole-slide image) is annotated. The annotation may include (for example) assigning a label (e.g., a binary label, classification label, numeric label, etc.) to a portion of the image and/or identifying a particular part of the image that is predicted to depict a given feature. The annotation may be performed in accordance with input received at a device operated by an annotator. The annotation may be repeatedly performed across different images and/or different portions of interest. The annotation may additionally or alternatively be performed to label different features (e.g., to first localize individual cells and to separately classify individual cells).

In some instances, the annotation is performed at block 215 in process flow 200. In some instances, the annotated images may be stored in image data store 240, such that each image is stored in association with corresponding label data generated via the annotation.

At block 410, data collection is performed. The data collection can include identifying particular annotated images and/or particular portions of annotated images. The particular images and/or particular portions may have been annotated to indicate that they were annotated to identify any particular type of feature of interest, that they depicted at least part of a particular type of feature of interest, that they depicted at least one particular type of feature of interest, and/or that they depicted at least a threshold quantity of a particular type of feature of interest. For example, the data collection may be performed to identify each image patch that was annotated to indicate that at 10 cells are depicted and that at least 2 macrophages are depicted. As another example, the data collection may be performed to identify each image patch that was annotated so as to identify each macrophage cell (irrespective as to whether any macrophages were detected).

In some instances, the data collection may be performed at pre-processing stage 210 via transmitting a query to image data store 240 and receiving a result identifying corresponding images and/or image portions. In some instances, the data collection is performed as part of labeling stage 215.

At block 415, data preparation is performed. The data preparation may include pre-processing in accordance with (for example) one or more pre-processing techniques disclosed herein. The data preparation may include defining one or more tiles or patches (e.g., each corresponding to a fraction of the image). The data preparation may include defining a ground truth mask, which may identify a portion of the image that depicts at least part of a tissue slice. The data preparation may be performed at pre-processing stage 210.

The prepared data (which may include multiple images and at least one label corresponding to each image) can be used to train and/or fine-tune a machine learning model at block 420. The training can include using a current version of the machine-learning model to generate predictions of labels (e.g., and corresponding confidence metrics), comparing the predicted labels to true labels (e.g., using a loss function), and adjusting parameters of the model based on the comparison. The training may further or additionally include fitting the current model using the model and/or one or more static variables (e.g., features of the image). The training or fine-tuning can be performed at model training stage 220.

At block 425, the trained model can be evaluated. The evaluation may characterize (for example) a sensitivity, specificity and/or accuracy of predicted labels. The evaluation may be performed at model training stage 220. The evaluation may include determining whether a given metric exceeds a predefined threshold. If the metric does not exceed the predefined threshold, the training (or fine tuning) and evaluation may be repeated until the predefined threshold is exceeded or until another condition is satisfied (e.g., at least a predefined number of training iterations are completed).

At block 430, whole-slide image inferencing is performed. The whole-slide image inferencing may be performed at stage 225 and may include generating a statistic for each of multiple portions in the whole-slide image based on confidence metrics associated with parts of the image within the portion. In some instances, the inferences further or alternatively generates a statistic for each of multiple portions in the whole-slide image based on predicted labels associated with parts of the image within the portion. Thus, a statistic may represent a confidence of labels within an image portion and/or may reflect an overall predicted label for an image portion. Block 430 may be performed by result generation stage 225 or (active) model training stage 220.

At block 435, a certainty heatmap is generated (e.g., at result generation stage 225 or (active) model training stage 220) that indicates a confidence-metric statistic for each of multiple portions within a whole-slide image. This image may be useful to guide a human annotator as to for which portions of an image review or labels are requested. For example, red regions may indicate that review of predicted labels is highly prioritize as compared to blue regions.

At block 440, new labels are identified (e.g., based on input received at a device of an annotator). The new labels may correspond to labels provided in association with image portions for which low-confidence predictions were generated.

The workflow may then return to block 420 to continue training based on the new labels. The iteration may continue until a stopping condition is satisfied (e.g., at least a predefined number of labels have been provided via annotation, at least a predefined number of training iterations have been performed, at least a predefined model accuracy has been achieved, an input from a human operator has corresponded to an acceptance of a model, etc.).

V. EXEMPLARY FRAMEWORK FOR DIGITAL PATHOLOGY PROCESSING

Figure 5:
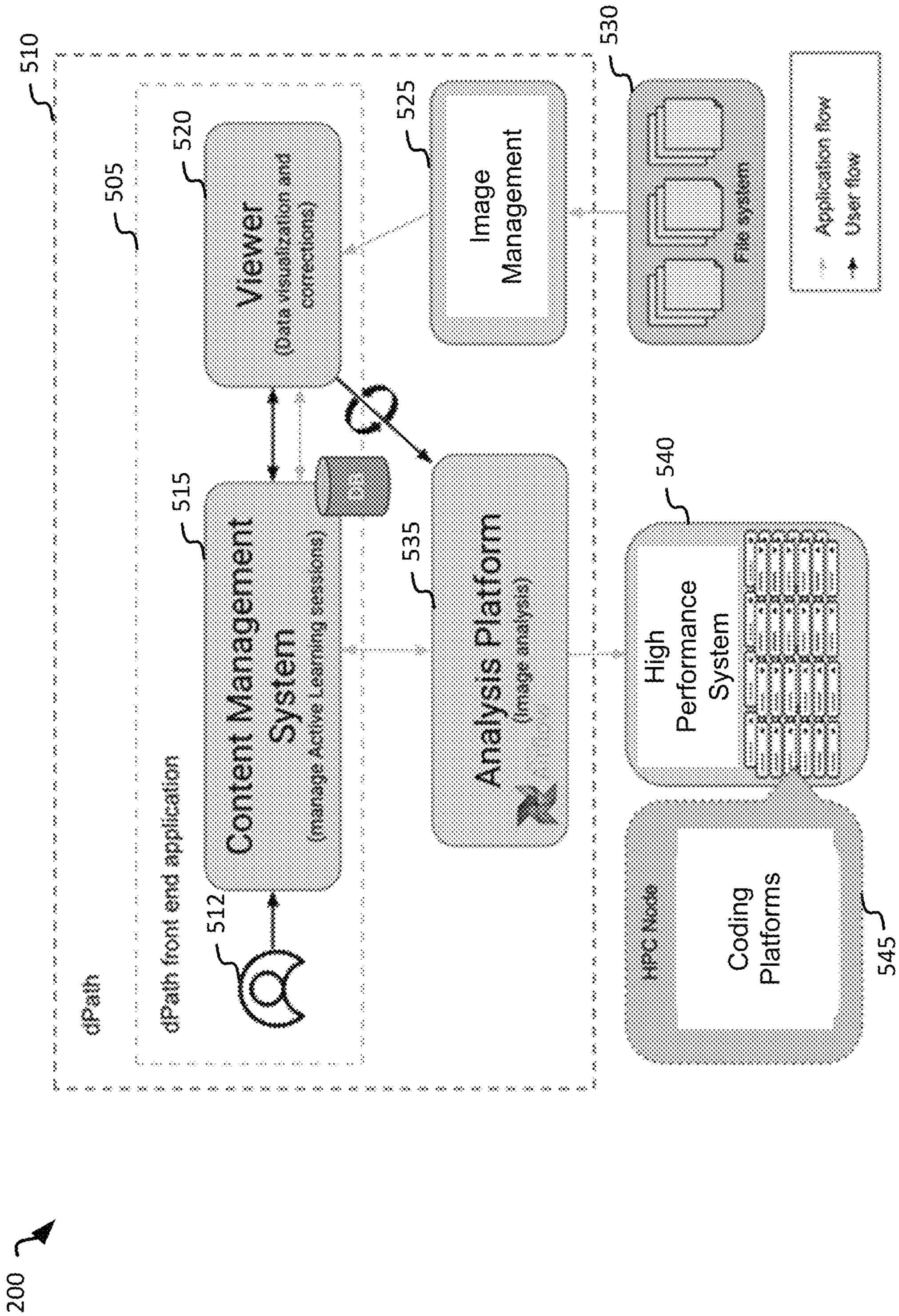
FIG. 5 discloses a network 500 with exemplary systems and applications that may be used in this respect.

As indicated herein, each of one or more systems may be involved in performing various actions and/or processing disclosed to train or use a machine-learning model to process images. FIG. 5 discloses a network 500 with exemplary systems and applications that may be used in this respect. Network 500 may include components that support part or all of process flow 200, part or all of the active learning workflow depicted in FIG. 3, and/or part or all of the exemplary workflow depicted in FIG. 4.

The systems and/or applications may individually or collectively support: high-resolution and/or high-speed image storage and retrieval; image visualization, data visualization, interactive data correction, and/or image analysis (e.g., image training and inference).

Network 500 includes a front-end application sub-network 505 that is supported by a set of interaction-supporting components 510. A user device 512 may communicate with (e.g., send communications to and receive communications from) a content management system 515, which may one or more manage active learning sessions with user device 512. Managing an active learning session can include coordinating actions performed by one or more other components in network 500.

A viewer component 520 may define and provide interfaces that are to availed to user device 512. An interface may include (for example) an image, one or more input components to label an image, one or more predicted labels, or other information as described herein.

Viewer component 520 may access the image by sending a request to an image management component 530. The request may include (for example) an indication of a type of image being requested (e.g., identifying an organ, stain type, subject disease type, subject age, etc.), an identifier of a specific image (e.g., identifying a specific subject), authorization information (e.g., identifying a user associated with user device 512 so as to allow image management component 530 to assess access privileges), identifying a particular clinical study, and/or identifying a particular machine learning model that is being trained or used (which may be associated with certain image types and/or certain image access restrictions). In some instances, the request is for a single image. In some instances, the request is for multiple images (which viewer component 520) may then present, in part or in full, concurrently or separately.

Image management component 530 may assess permissions associated with the request and, if it is determined that the request is permissible, may query a remote or local image file system 530 for the image(s). In some instances, image management component 530 pre-processes the image (s) before returning the image(s) to viewer component 520. For example, image management component 530 may crop or scale the image.

Additionally or alternatively, viewer component 520 can communicate with an analysis platform component 535 to coordinate image pre-processing. For example, the pre-processing can include identifying a point location of each of one or more cells depicts in an image. Analysis platform component 535 can further facilitate training and/or using a machine learning model. For example, labels that are identified based on input from user device 512 (e.g., predicting whether the cell is of a particular cell type, whether an image depicts an artifact, where a tumor boundary is, etc.) can be used to train the machine learning model. Subsequently, the machine learning model can be used to generate such predictions and potentially also corresponding confidence metrics. The training and use of the machine learning model can be performed using a high performance component 540 that includes (for example) fast processors and large memories. High performance component 540 can include multiple nodes 545, each of which may support one or more coding platforms. In some instances, each node 545 operates substantially independently so as to support parallel processing.

Analysis platform 535 may detect predicted labels associated with low confidence metrics and may facilitate (e.g., via content management system 515 and/or viewer component 520) requesting label reviews for these predicted labels. As further described herein, feedback from user device 512 that is indicative of a confirmation of, rejection of, or replacement of each label can then be used to retrain or fine-tune the model.

VI. EXAMPLE

A machine learning model was configured to detect depictions of macrophages in digital pathology images. For each image, a preprocessing step was performed to detect a location of each depicted nucleus.

Figure 6A:
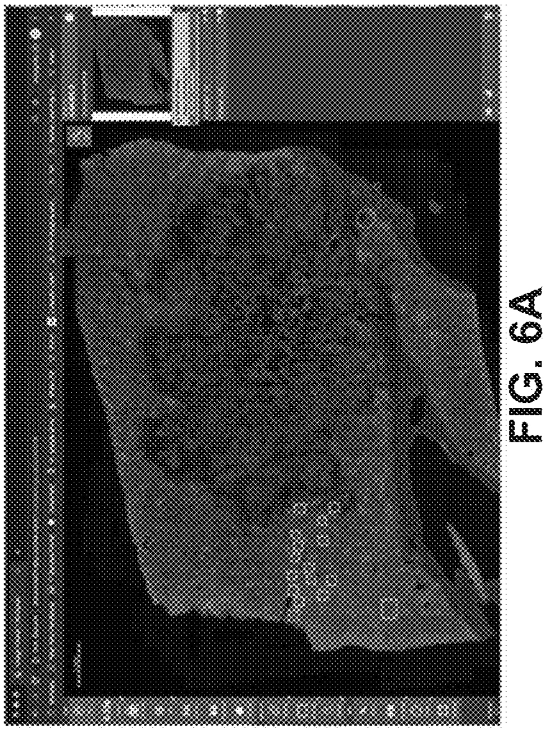
FIGS. 6A-6D depict exemplary images of part or all of a whole slide image to facilitate receiving labels for training a machine learning model.

FIG. 6A depicts an exemplary whole slide image of a stained slice of a sample. Each white box corresponds to a different field of view to which a user could magnify upon clicking on the box. Each of the depictions in FIGS. 6B-6D corresponds to a same particular field of view. Each of the dots represents a predicted location of a depicted nucleus (as identified in pre-processing).

Figure 6B:
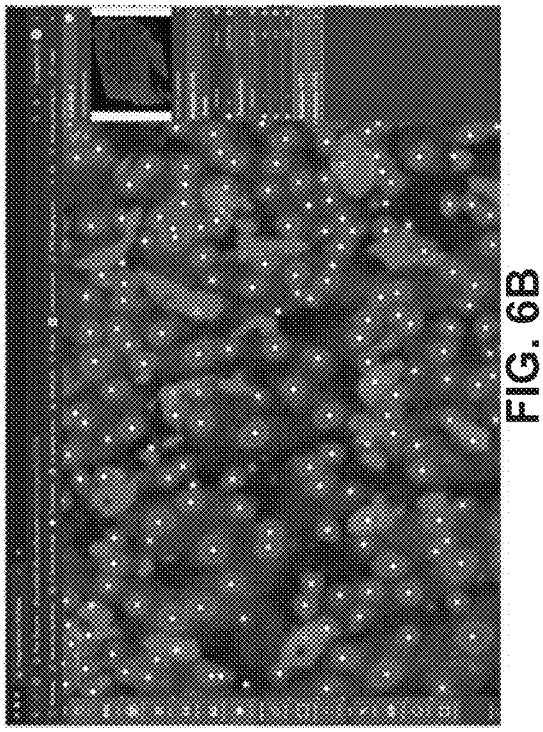

In FIG. 6B, each of the representations of the nuclei are the same relative to each other. The interface depicted in FIG. 6B is presented to a user during an initial training of the machine learning model to allow a user to select a subset of the nuclei to label as being macrophages or not. These labels (and other labels obtained using a similar technique) were used to initially train the model.

Figure 6C:
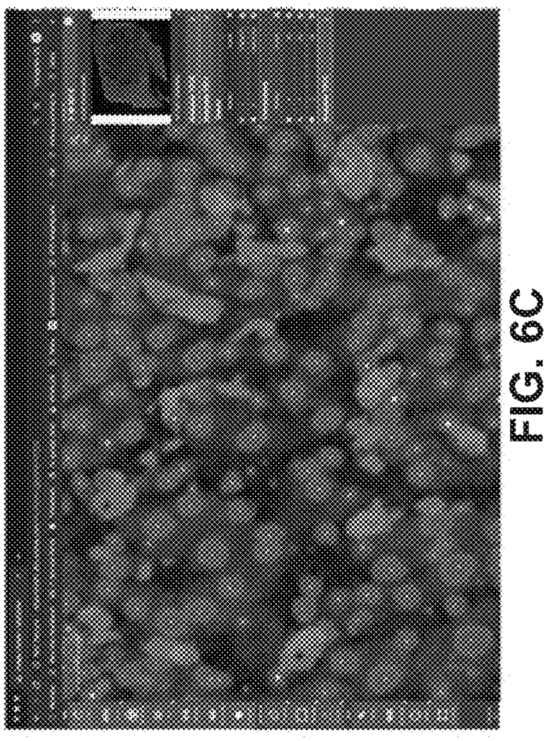

The model then predicted, for each identified nucleus, whether the nucleus corresponded to a macrophage or other cell type. For each nucleus, the model further output a confidence metric indicating a confidence in the prediction. FIG. 6C depicts the same field of view and nuclei identification, but the sizes and brightnesses of the dots associated with nuclei detections are scaled based on the confidence metrics. (Specifically, nuclei corresponding to confidence metrics above a threshold are represented with crosses, while others are represented with filled circles.) These visual characteristics can guide a user to label uncertain cells and/or review labels of uncertain cells (e.g., by clicking on the brighter dots and further providing input).

Upon receiving a first round of input that verified or corrected various label predictions, the model was further trained using the additional labels. The model then re-generated predictions as to whether various cells were macrophages and re-generated prediction metrics and confidence metrics.

Figure 6D:
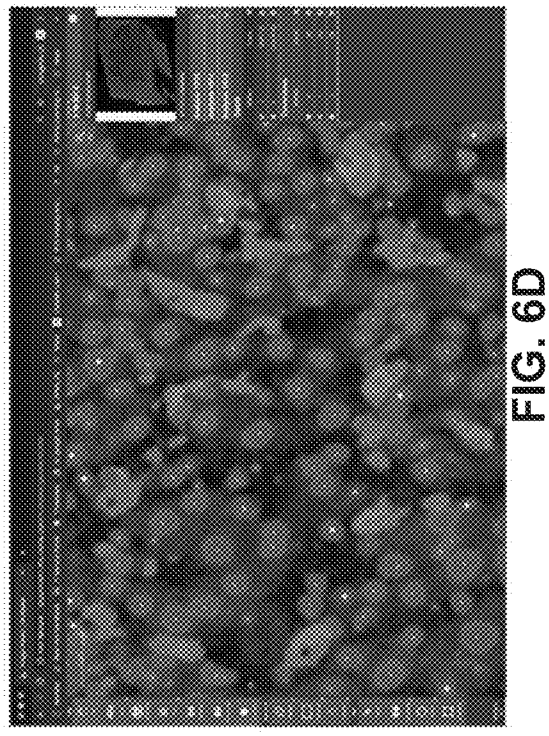

FIG. 6D depicts the same field of view and nuclei identification, but the sizes and brightnesses of the dots associated with nuclei detections are scaled based on the new confidence metrics. These updated visual characteristics can guide a user to labeling or reviewing portions of the image for which the updated model is least certain.

VII. ADDITIONAL CONSIDERATIONS

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for active learning in a digital pathology system comprising:
- accessing a machine learning model configured to use one or more parameters to process images to generate labels;
- executing the machine learning model to:
  - for each respective digital pathology image of a plurality of digital pathology images:
    - generate a plurality of predicted labels for the respective digital pathology image; and
    - generate confidence metrics for the respective digital pathology image by generating a confidence metric for each predicted label of the plurality of predicted labels for the respective digital pathology image;
- generating a plurality of certainty maps for the plurality of digital pathology images, wherein a certainty map is generated for each digital pathology image of the plurality of digital pathology images, wherein the certainty map for a given digital pathology image includes a set of values, and wherein each value of the set of values corresponds to a portion of the given digital pathology image and a predicted label of the plurality of predicted labels that is associated with the portion of the given digital pathology image;
- presenting, in an interface, a subset of digital pathology images of the plurality of digital pathology images, wherein the subset of digital pathology images represents digital pathology images of the plurality of digital pathology images having confidence metrics that are below a predefined threshold, and wherein presenting the subset of digital pathology images comprises presenting a part of each digital pathology image of the subset of digital pathology images overlaid with a representation of a portion of a respective certainty map of the plurality of certainty maps;
- receiving, in response to presenting the subset of digital pathology images, label input that confirms, rejects, or replaces at least one predicted label of the plurality of predicted labels; and
- updating the one or more parameters of the machine learning model based on the label input.

2. The method of claim 1, wherein a predicted label of the plurality of predicted labels identifies a classification of a cell, an estimated quantity of a particular type of cells within at least part of at least one digital pathology image, or a combination thereof.

3. The method of claim 1, wherein the interface is configured to:
- receive an input to represent statistics pertaining to regional confidence metrics at one magnification level;
- represent confidence metrics at another magnification level; and
- receive input to change the magnification level.

4. The method of claim 1, further comprising:
- receiving a new digital pathology image;
- transforming the new digital pathology image into one or more new labels that characterize the new digital pathology image or portions of the new digital pathology image; and
- outputting the one or more new labels.

5. The method of claim 1, further comprising:
- prior to generating a plurality of predicted labels for the respective digital pathology image: pre-processing an initial version of the respective digital pathology image to detect a location of each feature of interest, wherein generating the plurality of predicted labels for the respective digital pathology image includes generating a label corresponding to each detected location of interest within the respective digital pathology image.

6. The method of claim 1, further comprising:
- selecting, for each respective predicted label of the plurality of predicted labels, a size, color, or shape of a marker based on a confidence metric for the respective predicted label, wherein the interface differentially represents predicted labels based on corresponding confidence metrics by representing each predicted label of the plurality of predicted labels using markers using a marker having the size, color, or shape.

7. The method of claim 1, wherein the machine learning model includes a deep neural network.

8. A system comprising:
- one or more data processors; and
- a non-transitory computer readable storage medium containing instructions which, when executed on the one or more data processors, cause the one or more data processors to perform a set of operations including:
  - accessing a machine learning model configured to use one or more parameters to process images to generate labels;
  - executing the machine learning model to:
    - for each respective digital pathology image of a plurality of digital pathology images:
      - generate a plurality of predicted labels for the respective digital pathology image; and
      - generate confidence metrics for the respective digital pathology image by generating a confidence metric for each predicted label of the plurality of predicted labels for the respective digital pathology image;
  - generating a plurality of certainty maps for the plurality of digital pathology images, wherein a certainty map is generated for each digital pathology image of the plurality of digital pathology images, wherein the certainty map for a given digital pathology image includes a set of values, and wherein each value of the set of values corresponds to a portion of the given digital pathology image and a predicted label of the plurality of predicted labels that is associated with the portion of the given digital pathology image;

presenting, in an interface, a subset of digital pathology images of the plurality of digital pathology images, wherein the subset of digital pathology images represents digital pathology images of the plurality of digital pathology images having confidence metrics that are below a predefined threshold, and wherein presenting the subset of digital pathology images comprises presenting a part of each digital pathology image of the subset of digital pathology images overlaid with a representation of a portion of a respective certainty map of the plurality of certainty maps;

receiving, in response to presenting the subset of digital pathology images, label input that confirms, rejects, or replaces at least one predicted label of the plurality of predicted labels; and updating the one or more parameters of the machine learning model based on the label input.

9. The system of claim 8, wherein a predicted label of the plurality of predicted labels identifies a classification of a cell, an estimated quantity of a particular type of cells within at least part of at least one digital pathology image, or a combination thereof.

10. The system of claim 8, wherein the interface is configured to:

receive an input to represent statistics pertaining to regional confidence metrics at one magnification level;

represent confidence metrics at another magnification level; and receive input to change the magnification level.

11. The system of claim 8, wherein the set of operations further includes:

receiving a new digital pathology image;

transforming the new digital pathology image into one or more new labels that characterize the new digital pathology image or portions of the new digital pathology image; and outputting the one or more new labels.

12. The system of claim 8, wherein the set of operations further includes:

prior to generating a plurality of predicted labels for the respective digital pathology image: pre-processing an initial version of the respective digital pathology image to detect a location of each feature of interest, wherein generating the plurality of predicted labels for the respective digital pathology image includes generating a label corresponding to each detected location of interest within the respective digital pathology image.

13. The system of claim 8, wherein the set of operations further includes:

selecting, for each respective predicted label of the plurality of predicted labels, a size, color, or shape of a marker based on a confidence metric for the respective predicted label, wherein the interface differentially represents predicted labels based on corresponding confidence metrics by representing each predicted label of the plurality of predicted labels using markers using a marker having the size, color, or shape.

14. The system of claim 8, wherein the machine learning model includes a deep neural network.

15. A computer-program product tangibly embodied in a non-transitory machine-readable storage medium, including instructions configured to cause one or more data processors to perform a set of operations including:

accessing a machine learning model configured to use one or more parameters to process images to generate labels;

executing the machine learning model to:

for each respective digital pathology image of a plurality of digital pathology images:

generate a plurality of predicted labels for the respective digital pathology image; and generate confidence metrics for the respective digital pathology image by generating a confidence metric for each predicted label of the plurality of predicted labels for the respective digital pathology image;

generating a plurality of certainty maps for the plurality of digital pathology images, wherein a certainty map is generated for each digital pathology image of the plurality of digital pathology images, wherein the certainty map for a given digital pathology image includes a set of values, and wherein each value of the set of values corresponds to a portion of the given digital pathology image and a predicted label of the plurality of predicted labels that is associated with the portion of the given digital pathology image;

presenting, in an interface, a subset of digital pathology images of the plurality of digital pathology images, wherein the subset of digital pathology images represents digital pathology images of the plurality of digital pathology images having confidence metrics that are below a predefined threshold, and wherein presenting the subset of digital pathology images comprises presenting a part of each digital pathology image of the subset of digital pathology images overlaid with a representation of a portion of a respective certainty map of the plurality of certainty maps;

receiving, in response to presenting the subset of digital pathology images, label input that confirms, rejects, or replaces at least one predicted label of the plurality of predicted labels; and updating the one or more parameters of the machine learning model based on the label input.

16. The computer-program product of claim 15, wherein a predicted label of the plurality of predicted labels identifies a classification of a cell, an estimated quantity of a particular type of cells within at least part of at least one digital pathology image, or a combination thereof.

17. The computer-program product of claim 15, wherein the interface is configured to:

receive an input to represent statistics pertaining to regional confidence metrics at one magnification level;

represent confidence metrics at another magnification level; and receive input to change the magnification level.

18. The computer-program product of claim 15, wherein the set of operations further includes:

receiving a new digital pathology image;

transforming the new digital pathology image into one or more new labels that characterize the new digital pathology image or portions of the new digital pathology image; and outputting the one or more new labels.

19. The computer-program product of claim 15, wherein the set of operations further includes:

prior to generating a plurality of predicted labels for the respective digital pathology image: pre-processing an initial version of the respective digital pathology image to detect a location of each feature of interest, wherein generating the plurality of predicted labels for the respective digital pathology image includes generating a label corresponding to each detected location of interest within the respective digital pathology image.

20. The computer-program product of claim 15, wherein the set of operations further includes:

selecting, for each respective predicted label of the plurality of predicted labels, a size, color, or shape of a marker based on a confidence metric for the respective predicted label, wherein the interface differentially represents predicted labels based on corresponding confidence metrics by representing each predicted label of the plurality of predicted labels using markers using a marker having the size, color, or shape.

* * * * *